US011860358B2

United States Patent
Diaz et al.

(10) Patent No.: US 11,860,358 B2
(45) Date of Patent: Jan. 2, 2024

(54) ANGULAR LIGHT SENSOR AND EYE-TRACKING

(71) Applicant: Meta Platforms Technologies, LLC, Menlo Park, CA (US)

(72) Inventors: Liliana Ruiz Diaz, Redmond, WA (US); Ruiting Huang, Redmond, WA (US); Robin Sharma, Redmond, WA (US); Jonathan Robert Peterson, Woodinville, WA (US); Christopher Yuan Ting Liao, Seattle, WA (US); Andrew John Ouderkirk, Redmond, WA (US); Giancarlo Sigurd Sante Nucci, Seattle, WA (US); Clare Joyce Robinson, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/878,634

(22) Filed: Aug. 1, 2022

(65) Prior Publication Data

US 2023/0053107 A1 Feb. 16, 2023

Related U.S. Application Data

(60) Provisional application No. 63/232,674, filed on Aug. 13, 2021.

(51) Int. Cl.
*G02B 27/00* (2006.01)
*G02B 27/01* (2006.01)

(52) U.S. Cl.
CPC ..... *G02B 27/0093* (2013.01); *G02B 27/0179* (2013.01); *G02B 2027/0187* (2013.01)

(58) Field of Classification Search
CPC ............ G02B 27/0093; G02B 27/0179; G02B 2027/0187
See application file for complete search history.

(56) References Cited

U.S. PATENT DOCUMENTS 10,698,483 B1 * 6/2020 Ouderkirk .......... G02B 27/0176
2014/0160433 A1 * 6/2014 Brown, Jr. ........... A61B 3/0008
351/209

(Continued)

FOREIGN PATENT DOCUMENTS

WO 2020101891 A1 5/2020
WO 2020101895 A1 5/2020

(Continued)

OTHER PUBLICATIONS

Carvalho F. F., et al., "A Novel Hybrid Polarization-Quadrature Pixel Cluster for Local Light Angle and Intensity Detection," Association of Computing machinery, 2017, 7 pages.

(Continued)

*Primary Examiner* — Dmitriy Bolotin
(74) *Attorney, Agent, or Firm* — FREESTONE INTELLECTUAL PROPERTY LAW PLLC; Aaron J. Visbeek

(57) ABSTRACT

Angular sensors that may be used in eye-tracking systems are disclosed. An eye-tracking system may include a plurality of light sources to emit illumination light and a plurality of angular light sensors to receive returning light that is the illumination light reflecting from an eyebox region. The angular light sensors may output angular signals representing an angle of incidence of the returning light.

18 Claims, 15 Drawing Sheets

(56) References Cited

U.S. PATENT DOCUMENTS

| | | | |
|---|---|---|---|
| 2018/0255250 A1* | 9/2018 | Price | G06V 10/141 |
| 2019/0101980 A1* | 4/2019 | Stafford | G02C 11/10 |
| 2020/0158943 A1* | 5/2020 | Calafiore | G02B 5/1814 |
| 2021/0011303 A1 | 1/2021 | Andreev et al. | |
| 2021/0409632 A1* | 12/2021 | Zahnert | G02B 27/42 |

FOREIGN PATENT DOCUMENTS

| | | | |
|---|---|---|---|
| WO | 2020132243 A1 | 6/2020 | |
| WO | 2020163663 A1 | 8/2020 | |

OTHER PUBLICATIONS

Qu L., et al., "Analysis and Adjustment of Positioning Error of PSD System for Mobile SOF-FTIR," Sensors, 2019, vol. 19, No. 23, 16 pages.

Wang A., et al., "Light Field Image Sensors Based on the Talbot Effect," Applied Optics, Nov. 1, 2009, vol. 48, No. 31, pp. 5897-5905.

Wang H., et al., "CMOS Self-Powered Monolithic Light-Direction Sensor with Digitalized Output," Optics Letters, May 1, 2014, vol. 39, No. 9, pp. 2618-2621.

Wang H., et al., "On-Chip Sensor for Light Direction Detection," Optics Letters, Nov. 15, 2013, vol. 38, No. 22, pp. 4554-4557.

Wang Y., et al., "Analog Detection of PSD Sensor and Sunshine Position Tracking Performance in Four Quadrant Arrays," International Journal of Performability Engineering, Sep. 2019, vol. 15, No. 9, pp. 2346-2355.

International Search report and Written Opinion for International Application No. PCT/US2022/040335, dated Dec. 12, 2022, 15 pages.

\* cited by examiner

Talbot Effect

- Periodic structure -> amplitude grating
- Self imaging at m Talbot distance
- Talbot distance $z = \dfrac{\lambda}{1-\sqrt{1-\lambda^2/d^2}}$, $d$ is the grating pitch and $\lambda$ is the light wavelength in the medium; $z = \dfrac{2d^2}{\lambda}$ for $d \gg \lambda$   *EQUATION 781*   *EQUATION 782*
- Phase-reversed self imaging at $(2m+1)/2$ Talbot distance
- Off axis Talbot effect, $z = \dfrac{2d^2}{\lambda}\cos(\theta)^3$, $\theta$ is the incident angle and images exhibit a lateral shift $\Delta x = z \tan\theta$   *EQUATION 783*

FIG. 7B

ANGULAR LIGHT SENSOR AND EYE-TRACKING

CROSS-REFERENCE TO RELATED APPLICATIONS

This application claims priority to U.S. provisional Application No. 63/232,674 filed Aug. 13, 2021, which is hereby incorporated by reference.

TECHNICAL FIELD

This disclosure relates generally to optics, and in particular to angular light sensors.

BACKGROUND INFORMATION

Angular light sensors may be used in a variety of contexts such as imaging, displays, and photovoltaics. Existing angular light sensors may be bulky, power inefficient, and/or have slow processing times. Hence, the applications the existing angular light sensors can be deployed in may be limited.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7B includes equations that provide the Talbot distance z for Talbot images with respect to a grating pitch d and a wavelength $\lambda$ of incident light on a Talbot sensor, in accordance with aspects of the disclosure.

DETAILED DESCRIPTION

Figure 1:
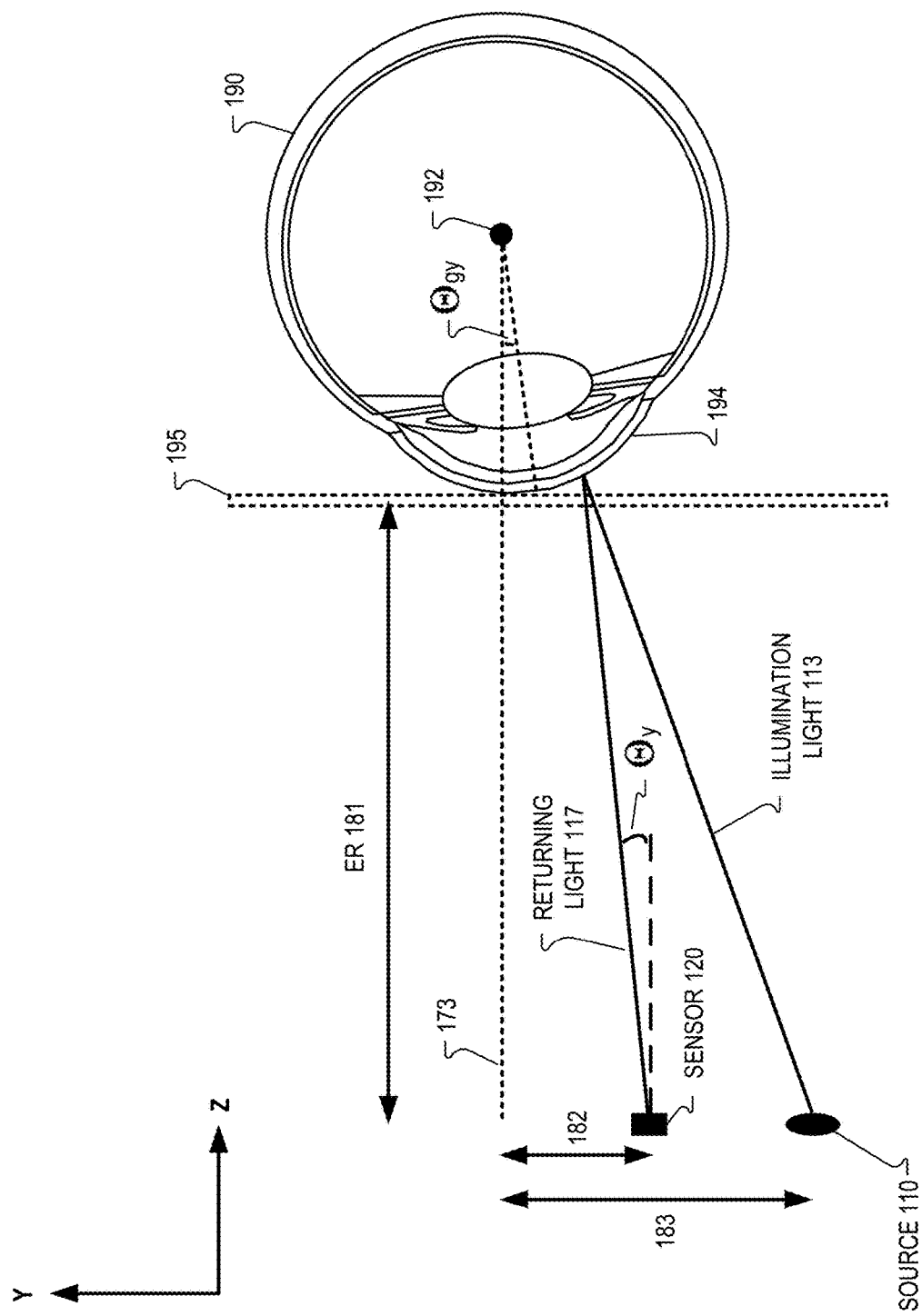
FIG. 1 illustrates a source-sensor pair for determining eye gaze angles, in accordance with aspects of the disclosure.

Embodiments of angular light sensors and eye tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

In certain fields, including augmented reality (AR) and virtual reality (VR), there is a need to develop light sensors with lower power consumption, smaller form factor, and/or reduced processing time than those currently commercially available. Solutions that do not require cameras, such as photosensor oculography (PSOG) or position sensitive detectors are particularly attractive as they require less processing time and are able to detect eye movements faster than camera based eye-tracking systems. In addition, there is interest in being able to detect fixational eye movements (the smallest type of eye movements), as they carry meaningful cognitive and attentional information that can be used in AR/VR systems.

A potential non-invasive solution for a low form factor, low power, low computational, fast eye tracking is using micro sized angular sensors to detect light from a near eye light source that has been reflected onto the eye cornea surface. Both the source and sensor can be placed in-field on a near-eye optical element (e.g. in the lens) of a head mounted device such as smartglasses or AR glasses. "In-field" means that the source and sensor may be placed in a field of view of a user of a head mounted device such as the lens of a near-eye optical element held by a frame of a head mounted device, where the user would look through the lens to see their external environment.

FIG. 1 illustrates a source-sensor pair for determining eye gaze angles, in accordance with implementations of the disclosure. FIG. 1 includes a light source 110 and a sensor 120. Light source 110 may be an LED, a vertical-cavity surface-emitting laser (VCSEL), photonic integrated circuit (PIC) having an emission aperture that emits light, or otherwise. Light source 110 may be an infrared light source. Light source 110 may be a near-infrared light source. Sensor 120 may be an angular light sensor in accordance with implementations of the disclosure. Sensor 120 and source 110 function as a sensor-source pair to retrieve eye gaze angle in the y-direction by measuring the angle of incidence on sensor 120. Several sensors and sources can be used at the same time or by controlling the light emission temporally. In some implementations, the source(s) and sensor(s) are not "in-field" and rather are placed on a frame of smartglasses, AR glasses, or a VR headset.

Desirable attributes of angular light sensors for use in AR/VR applications may include micro-scale sensors (if it is placed in-field), high angular resolution, relatively large angular range, out-of-axis sensitivity peak, and/or increased computational speed. These attributes would be particularly desirable for angular light sensors in an eye-tracking context.

FIG. 1 shows a source 110 illuminating eyebox region 195 with illumination light 113. Illumination light 113 may reflect/scatter off of cornea 194 of eye 190 occupying eyebox region 195 as returning light 117. Point 192 represents a center of rotation of eye 190 and may be used as a reference to measure an eye gaze angle $\theta_{gy}$. Source 110 may be selectively activated to emit illumination light 113 so that source 110 may turn on and off. The eye gaze angle $\theta_{gy}$ from looking straight ahead is measured using source 110 and angular light sensor 120 where source 110 and angular light sensor are disposed at an eye relief plane having an eye relief distance 181. Eye relief distance 181 may be approximately 16 mm or 20 mm in some examples. In the illustrated example of FIG. 1, angular light sensor 120 is disposed a distance 182 from a vector 173 representing eye 190 looking straight ahead and source 110 is disposed a distance 183 from vector 173. Angular light sensor 120 measures the angle of incidence $\theta_y$ of returning light 117.

In implementations of the disclosure, a plurality of light sources and a plurality of angular light sensors may be used in an eye-tracking system to determine an eye gaze angle of eyes of a wearer of a head mounted device. The angular light sensors can be placed on the frame or "in field" on a transparent or semi-transparent near-eye optical element of a head mounted device. For "in-field" placements, the angular light sensors and the light sources may need to be inconspicuous to the user. This means that the sensor area may be smaller than 150×150 microns, in some implementations.

Other desirable attributes for angular light sensors-based eye-tracking for AR/VR are to have high angular resolution (between 1 arc min to 60 arc min) and/or relatively large angular detection range (e.g. 1 deg to 90 deg). The angular detection range of angular light sensors may also be referred to as field of view (FOV) of the angular light sensors in this disclosure. Another desirable attribute for angular light sensors may include an out-axis angular peak sensitivity while blocking undesirable signal and stray light.

Figure 2A:
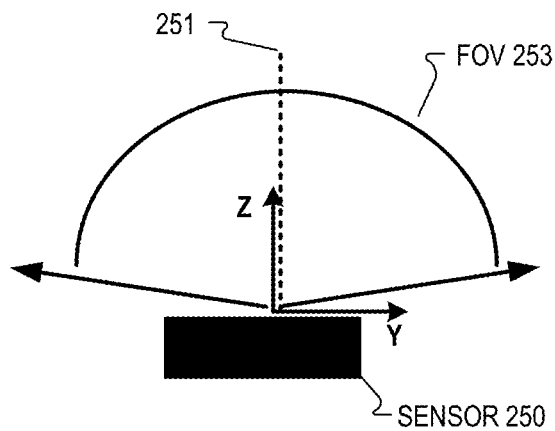
FIG. 2A illustrates a light sensor having a sensing plane and a surface-normal vector that is normal to the sensing plane of light sensor.

FIG. 2A illustrates a light sensor 250 having a sensing plane (y) and a surface-normal vector 251 that is normal to the sensing plane of light sensor 250. Light sensor 250 has a large FOV 253 that is approximately 160 degrees and centered around surface-normal vector 251. Sensor 250 has low angular resolution. Most currently commercially available solar tracking sensors are similar to sensor 250.

Figure 2B:
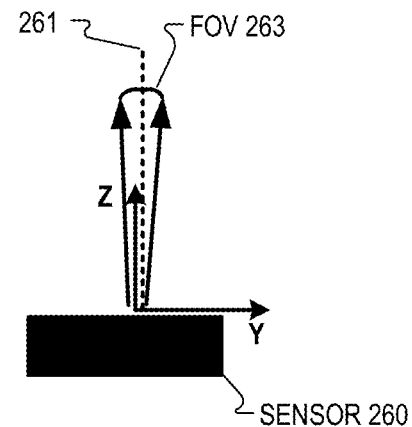
FIG. 2B illustrates a light sensor having a smaller field of view (FOV) and a higher angular resolution than the sensor of FIG. 2A.

FIG. 2B illustrates a light sensor 260 having a smaller FOV and a higher angular resolution than sensor 250. Light sensor 260 has a sensing plane (y) and a surface-normal vector 261 that is normal to the sensing plane of light sensor 260. Light sensor 260 has a FOV 263 that is approximately 10 degrees and centered around surface-normal vector 261. These types of light sensor architectures are typically used for laser alignment or micro-electro-mechanical system (MEMS) mirror feedback and usually require multiple reflections using prisms or gratings to achieve high angular precision.

Figure 2C:
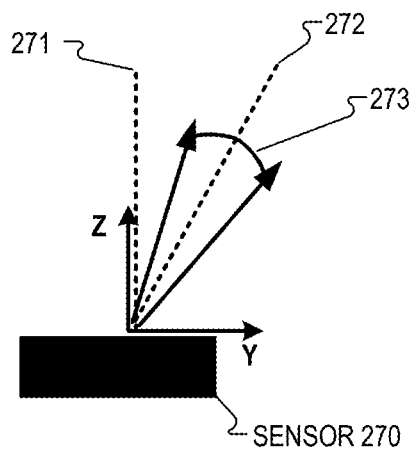
FIG. 2C illustrates an angular light sensor having a higher resolution and a relatively large FOV, in accordance with aspects of the disclosure.

FIG. 2C illustrates an angular light sensor 270 having a higher resolution and a relatively large FOV 273, in accordance with implementations of the disclosure. Angular light sensor 270 has a sensing plane (y) and a surface-normal vector 271 that is normal to the sensing plane of angular light sensor 270. Angular light sensor 270 has a FOV 273 that is approximately 30 degrees and is tilted with respect to surface-normal vector 271. In particular in FIG. 2C, FOV 273 is centered around center-vector 272 and center-vector 272 is tilted with respect to surface-normal vector 271. In some implementations, angular light sensor 270 has an angular detection range between 1 degree and 85 degrees with respect to a photodetector surface of sensor 270.

Figure 3A:
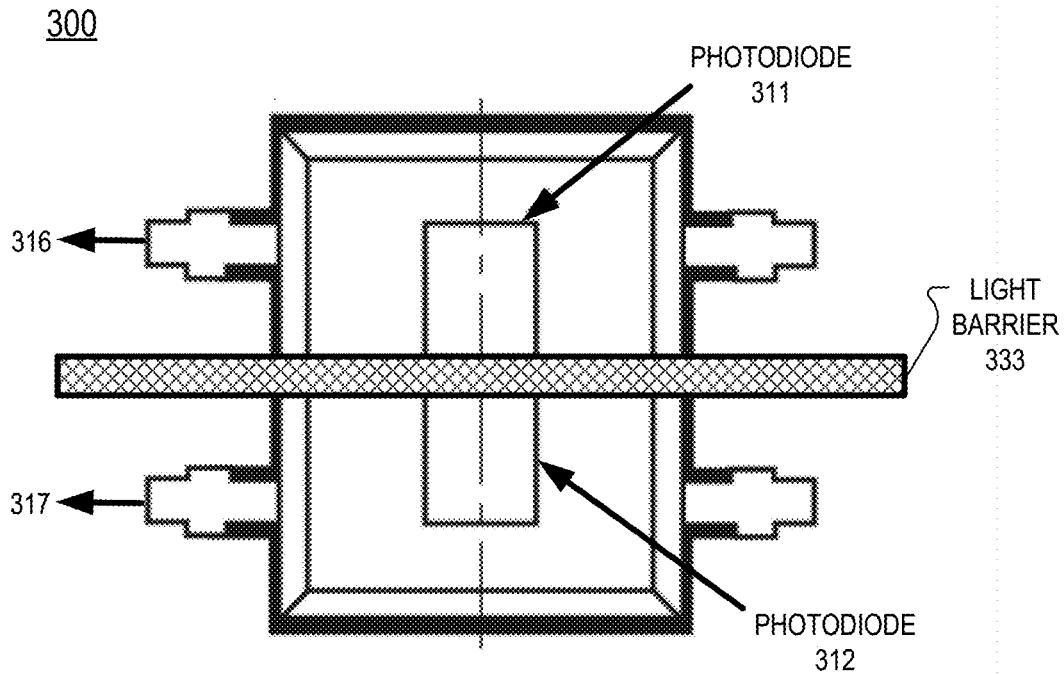
FIGS. 3A and 3B illustrate an angular light sensor having a first photodiode, a second photodiode, and a tilted light barrier, in accordance with aspects of the disclosure.
Figure 3B:
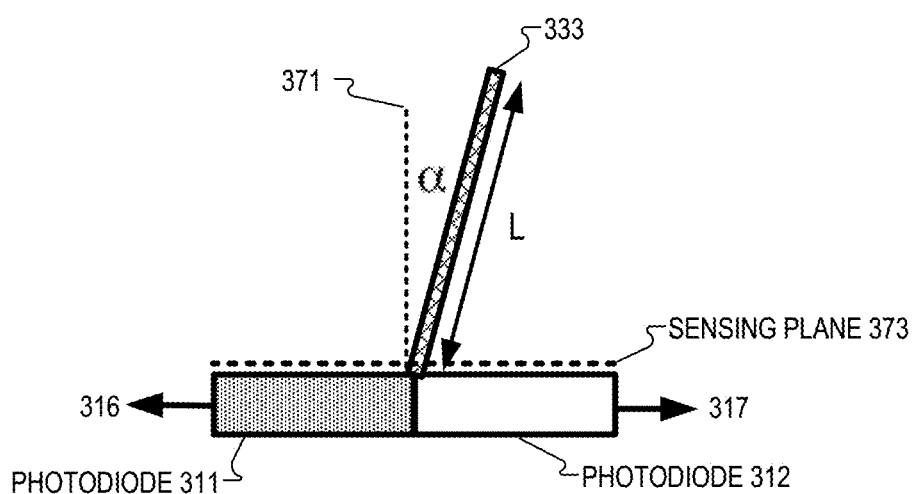

FIGS. 3A and 3B illustrate an angular light sensor 300 having a first photodiode 311, a second photodiode 312, and a tilted light barrier 333, in accordance with implementations of the disclosure. The tilted light barrier 333 is disposed between the first photodiode 311 and the second photodiode 312. A ratio of a first signal 316 generated by first photodiode 311 and a second signal 317 generated by second photodiode 312 indicates the angle of incidence of the returning light (e.g. returning light 117).

FIG. 3B illustrates tilted light barrier 333 being angled with respect to a surface-normal vector 371 of a sensing plane 373 common to both first photodiode 311 and second photodiode 312. In some examples, the angle α that the tilted light barrier is offset with respect to vector 371 is approximately 15 degrees. Other angles may be used. In an implementation, the length L of the tilted light barrier is 3 mm.

Figure 3C:
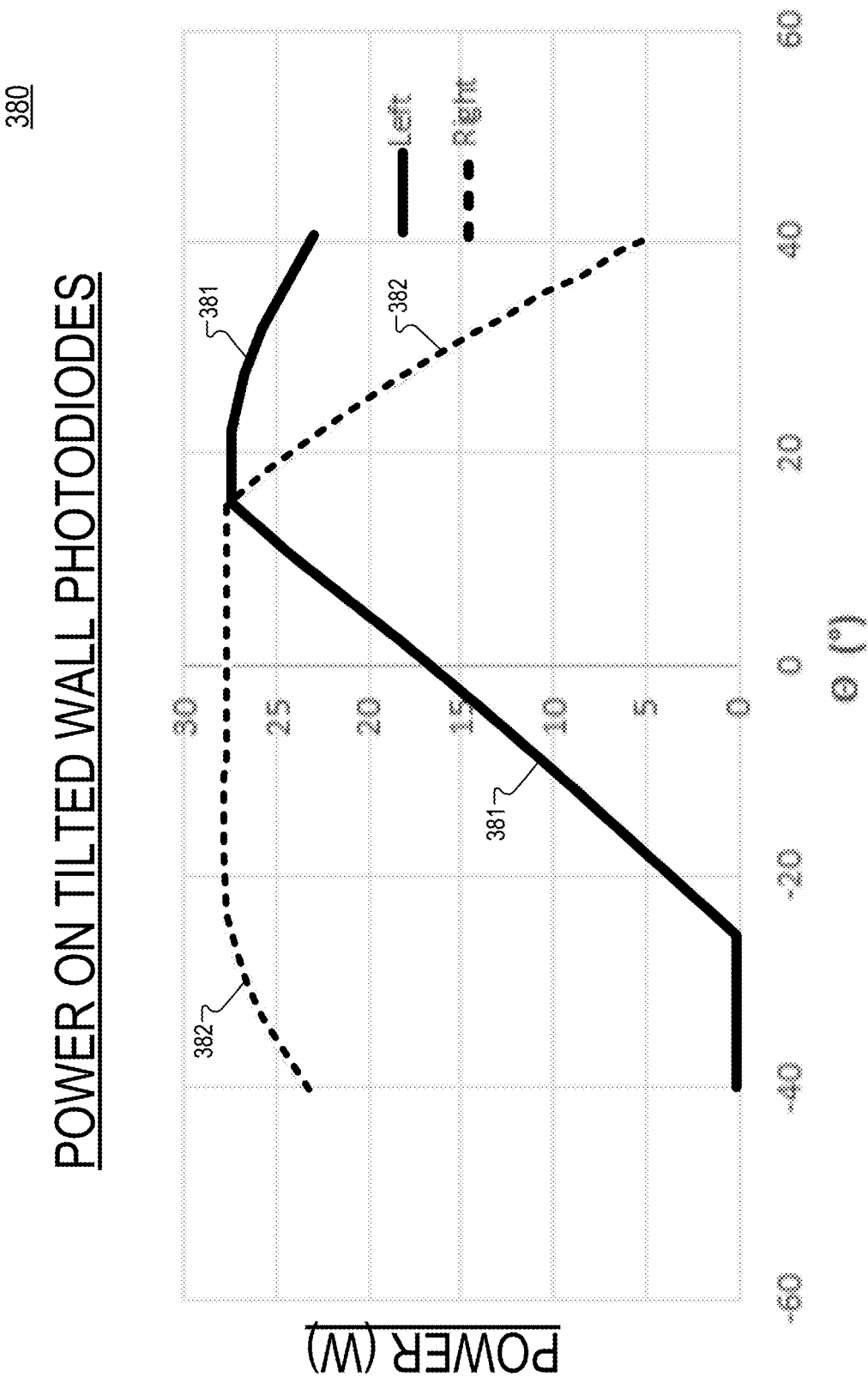
FIG. 3C illustrates an example chart illustrating the expected power of photodiodes separated by a tilted light barrier, in accordance with aspects of the disclosure.

FIG. 3C illustrates an example chart 380 illustrating the expected power of photodiodes separated by a tilted light barrier, in accordance with implementations of the disclosure. Line 381 illustrates the example power output of the left photodiode (e.g. photodiode 311) over different angles of incidence θ and line 382 illustrates the example power output of the right photodiode (e.g. photodiode 312) over different angles of incidence θ.

Figure 4A:
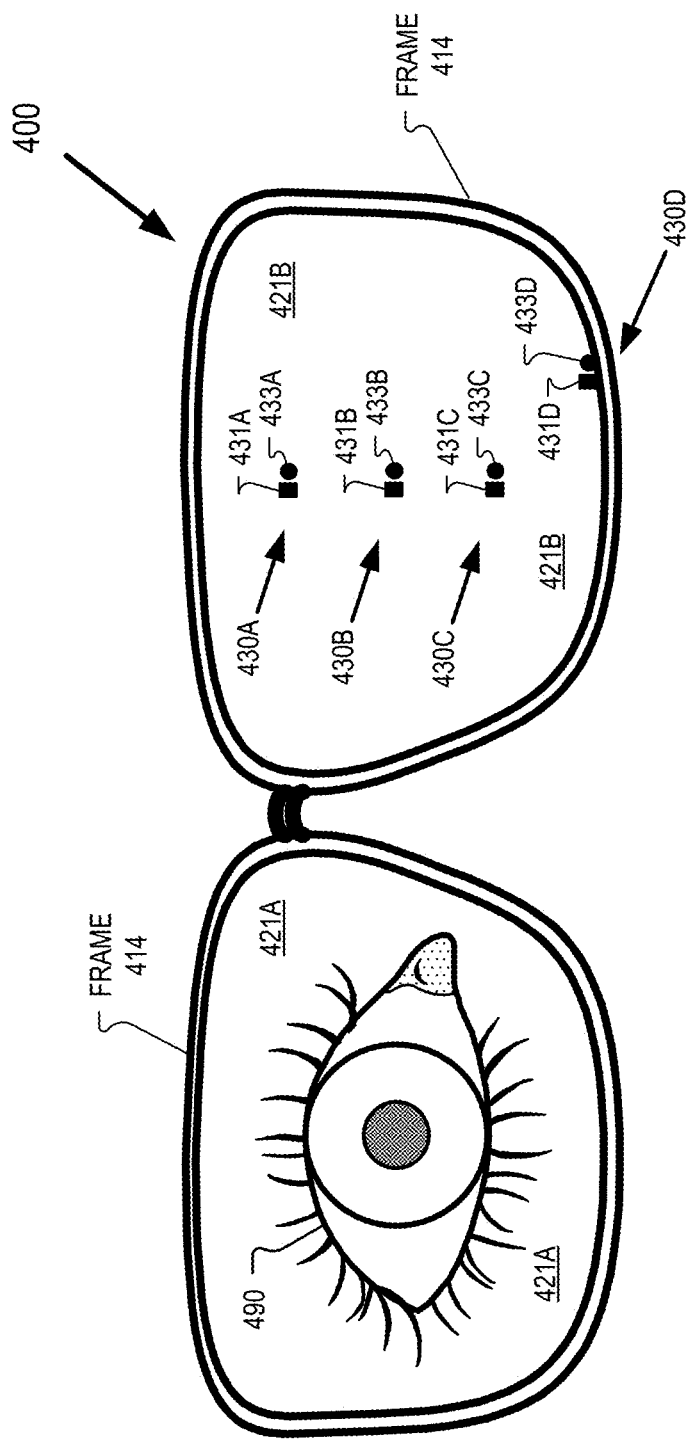
FIG. 4A illustrates a portion of a head mounted device including a frame and near-eye optical elements secured by the frame, in accordance with aspects of the disclosure.

FIG. 4A illustrates a portion of a head mounted device 400 including a frame 414 and near-eye optical elements 421A and 421B secured by frame 414, in accordance with implementations of the disclosure. Although not particularly illustrated, head mounted device 400 may include arms coupled to frame 414 that secure the head mounted device to a head of a user. FIG. 4A illustrates that eye 490 may view an external environment of head mounted device 400 through a transparent or semi-transparent near-eye optical element 421A or 421B. In other words, scene light from the external environment may propagate through near-eye optical elements 421A and/or near-eye optical elements 421B. In some implementations, near-eye optical elements 421A and/or 421B may include all or a portion of a near-eye display system to provide augmented reality images to eye 490. Near-eye optical elements 421A and 421B may be referred to as a "lens" of head mounted device 400.

FIG. 4A illustrates that near-eye optical element 421B includes three sensor-source pairs 430A, 430B, and 430C that are disposed "in-field." However, the sensor-source pairs may be small enough to be inconspicuous and unnoticeable to a wearer of head mounted device 400. Sensor-source pair 430A includes source 433A and angular light sensor 431A. Sensor-source pair 430B includes source 433B and angular light sensor 431B and sensor-source pair 430C includes source 433C and angular light sensor 431C. Additionally, FIG. 4A illustrates a sensor-source pair 430D that is mounted to frame 414 of head mounted device 400. Sensor-source pair 430D includes source 433D and angular light sensor 431D. While only one sensor-source pair is illustrated as mounted to frame 414, a plurality of sensor-source pairs may be mounted to frame 414 (e.g. around the frame), in some implementations. The sources 433A, 433B, 433C, and 433D (collectively referred to as sources 433) and angular light sensors 431A, 431B, 431C, and 431D (collectively referred to as angular light sensors 431) may have the features of the angular light sensors and light sources described with respect to FIGS. 1-3B. In a given sensor-source pair, the light source may be separated from the angular light sensor by less than 500 microns. In an implementation, the light source and the angular light sensor are separated by approximately 200 microns.

Figure 4B:
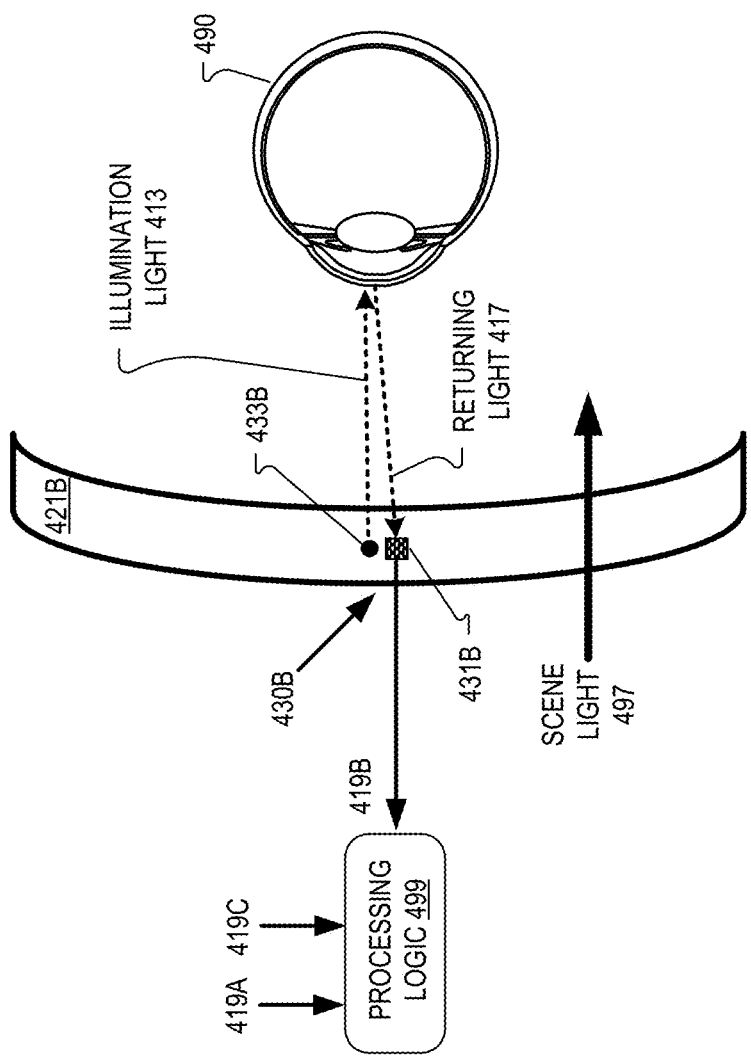
FIG. 4B illustrates a slice of near-eye optical element including a sensor-source pair, in accordance with aspects of the disclosure.

FIG. 4B illustrates a slice of near-eye optical element 421B including sensor-source pair 430B, in accordance with implementations of the disclosure. FIG. 4B shows that visible scene light 497 from an external environment may propagate through near-eye optical element 421B to eye 490. Hence, near-eye optical element 421B may be used in an AR context.

Light source 433B may emit illumination light 413 to an eyebox region that eye 490 occupies. Illumination light 413 is reflected or scattered by eye 490 as returning light 417 and measured/detected by angular light sensor 431B. Processing logic 499 may receive one or more angular signals 419B from angular light sensor 431B. The angular signals may represent an angle of incidence of the returning light with respect to positions of the angular light sensors. The angular signals may be generated from photodetectors (e.g. photodiodes) of the angular light sensors. Processing logic 499 may also receive one or more angular signals from additional angular light sensors (e.g. angular signal(s) 419A from sensor 431A and angular signal(s) 419C from sensor 431C). The processing logic 499 may also drive light sources 433 to selectively emit the illumination light 413. Processing logic 499 may be disposed in the frame 414 or arms (not particularly illustrated) of head mounted device 400.

Figure 5:
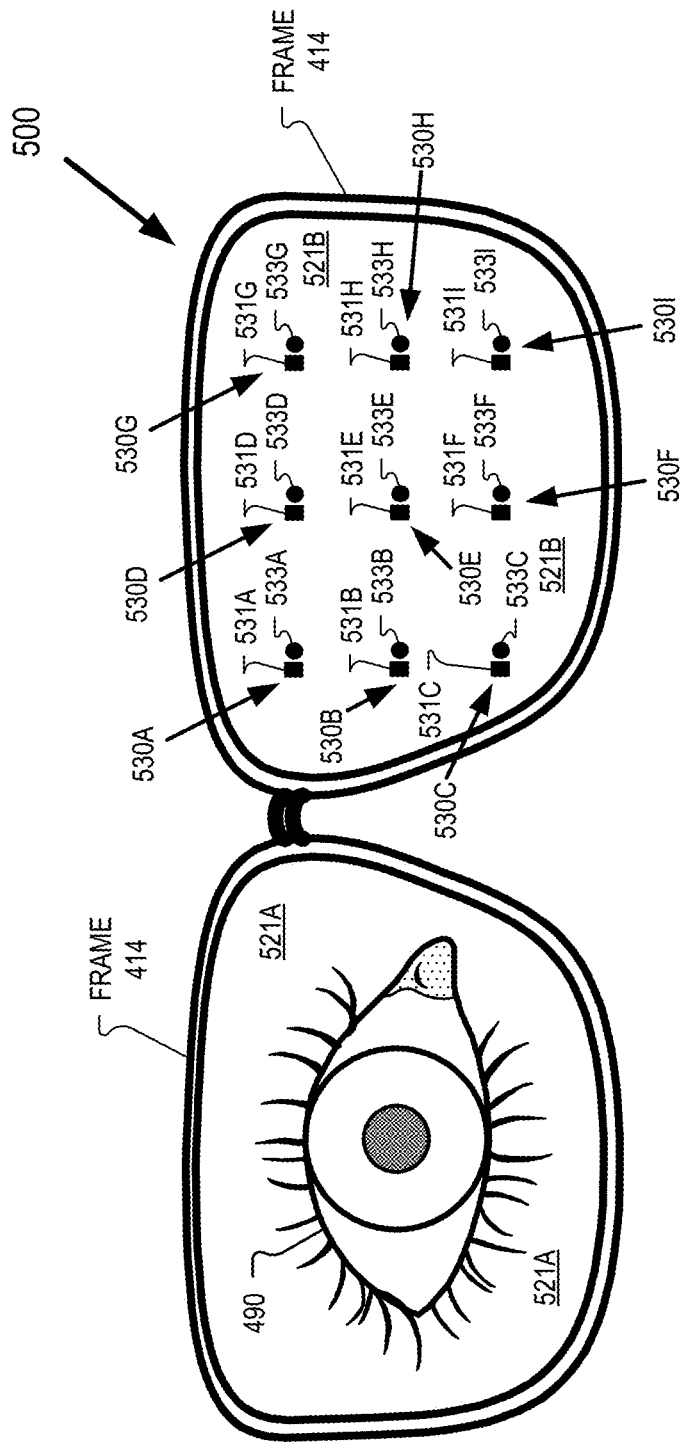
FIG. 5 illustrates a portion of a head mounted device having a 3×3 array of sensor-source pairs for two-dimensional eye gaze detection, in accordance with aspects of the disclosure.

FIG. 5 illustrates a portion of a head mounted device 500 having a 3×3 array of sensor-source pairs for two-dimensional eye gaze detection, in accordance with implementations of the disclosure. Head mounted device 500 includes frame 414 and near-eye optical elements 521A and 521B secured by frame 414. Although not particularly illustrated, head mounted device 500 may include arms coupled to frame 414 that secure the head mounted device 500 to a head of a user. FIG. 5 illustrates that eye 490 may view an external environment of head mounted device 500 through a transparent or semi-transparent near-eye optical element 521A or 521B. In other words, scene light from the external environment may propagate through near-eye optical elements 521A and/or near-eye optical elements 521B. In some implementations, near-eye optical elements 521A and/or 521B may include all or a portion of a near-eye display system to provide augmented reality images to eye 490. Near-eye optical elements 521A and 521B may be referred to as a "lens" of head mounted device 500.

FIG. 5 illustrates that near-eye optical element 521B includes nine sensor-source pairs 530A, 530B, 530C, 530D, 530E, 530F, 530G, 530H, and 530I (collectively referred to as sensor-source pairs 530) that are disposed "in-field." However, the sensor-source pairs 530 may be small enough to be inconspicuous and unnoticeable to a wearer of head mounted device 500.

Sensor-source pair 530A includes source 533A and angular light sensor 531A. Sensor-source pair 530B includes source 533B and angular light sensor 531B; sensor-source pair 530C includes source 533C and angular light sensor 531C; sensor-source pair 530D includes source 533D and angular light sensor 531D; sensor-source pair 530E includes source 533E and angular light sensor 531E; sensor-source pair 530F includes source 533F and angular light sensor 531F; sensor-source pair 530G includes source 533G and angular light sensor 531G; sensor-source pair 530H includes source 533H and angular light sensor 531H; and sensor-source pair 530I includes source 533I and angular light sensor 531I. The sources 533A, 533B, 533C, 533D, 533E, 533F, 533G, 533H, and 533I (collectively referred to as sources 533) and angular light sensors 531A, 531B, 531C, 531D, 531E, 531F, 531G, 531H, and 531I (collectively referred to as angular light sensors 531) may have the features of the angular light sensors and light sources described with respect to FIGS. 1-3B.

The light sources 533 may emit illumination light to an eyebox region occupied by an eye of a wearer of head mounted device 500 and the angular light sensors 531 may detect/measure the returning light that is reflected by a cornea of the eye. Processing logic similar to processing logic 499 may receive angular signals outputted by the plurality of angular light sensors 531. The angular signals may be generated from photodetectors (e.g. photodiodes) of the angular light sensors. The processing logic may also drive light sources 533 to selectively emit the illumination light.

The signals on the angular light sensors depend on the source-sensor placement and on the biometric characteristics of the user (e.g. eye-relief or cornea curvature).

Figure 6:
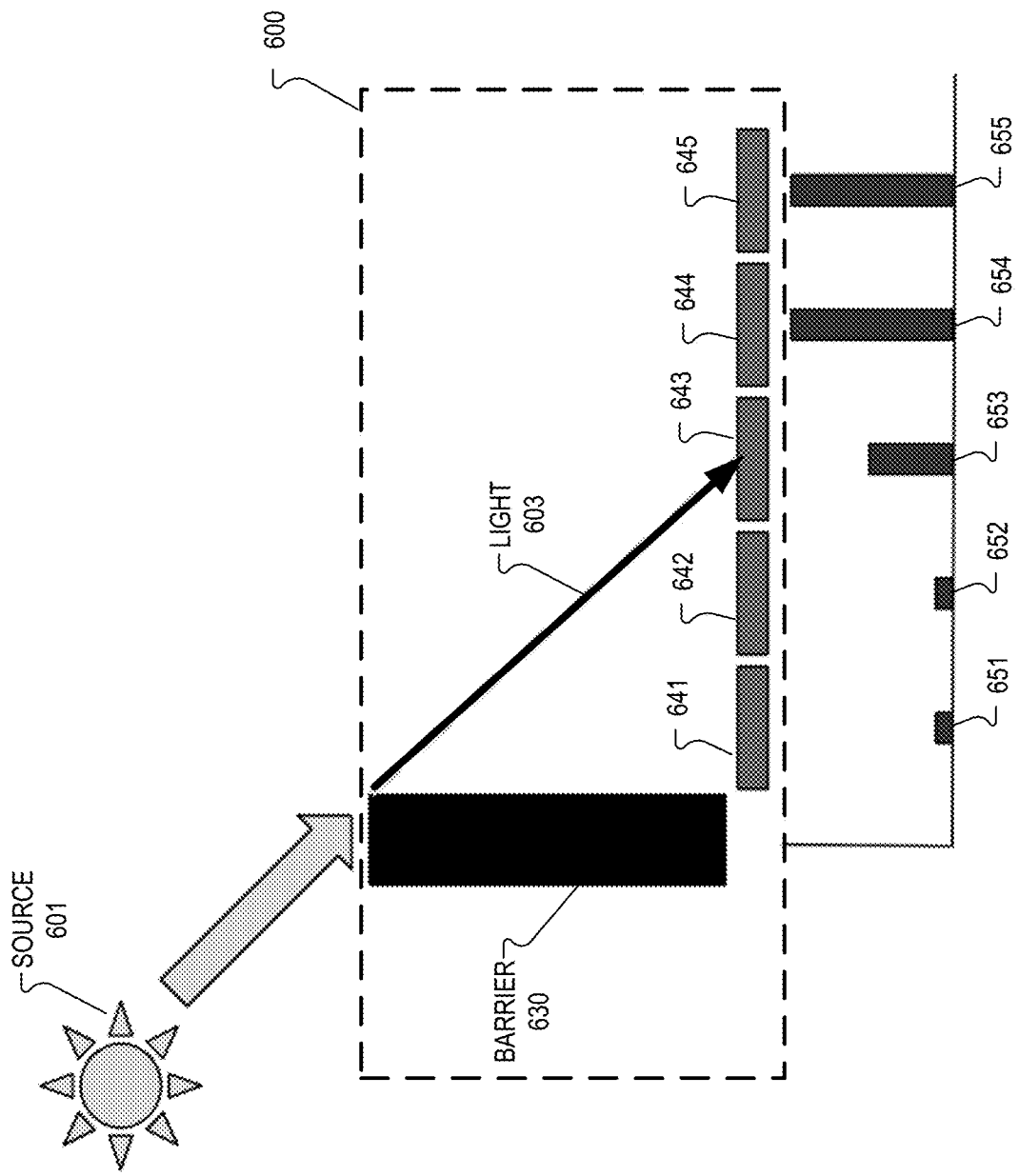
FIG. 6 illustrates an example angular light sensor having more than two photodetectors and a light barrier, in accordance with aspects of the disclosure.

FIG. 6 illustrates and example angular light sensor 600 having more than two photodetectors and a light barrier 630, in accordance with implementations of the disclosure. Angular light sensor 600 includes a light barrier 630 and photodetectors (e.g. photodiodes) 641, 642, 643, 644, and 645. Source 601 illuminates sensor 600 with light 603 and photodetectors 641, 642, 643, 644, and 645 generate signals 651, 652, 653, 654, and 655, respectively. In an implementation, a center of mass calculation may be used to compute an interpolated position based on data obtained at discrete steps. For the purpose of a photo-sensitive array, or a strip of photodetectors in a row, a center of mass calculation could be used to determine where the light is most concentrated on the surface. In this system, the signal observed by some photodetectors is greater than the signal observed by others, due to the fact that light barrier 630 casts a shadow on at least some of the photodetectors. By way of example, assume signals 651 and 652 are 10, signal 653 is 50, and signal 654 and signal 655 are 100. We assign a weighting factor to each of the photodiodes based on its distance from the light barrier 630. The first weighting factor assigned to the first signal 651 is 0, the second weighting factor assigned to the second signal 652 is 1, the third weighting factor assigned to the third signal 653 is 2, the fourth weighting factor assigned to the fourth signal 654 is 4, and the fifth weighting factor assigned to the fifth signal 655 is 4. Hence, the following equations can be formed:

TotalSignal=10+10+50+100+100

WeightedSignal=0*10+1*10+2*50+3*100+4*100

CenterOfMass=WeightedSignal/TotalSignal

In implementations of the disclosure, an eye-tracking system includes angular light sensors and light sources placed on the frame or in-field for AR or VR devices. Each light source may have a cone of emission that is directed to a cornea of an eye. The angular light sensors may have output connections (e.g. electrical pins) for computation of an angle of incidence of incident light. In some implementations, the FOV of the angular light sensor is tilted with respect to a vector normal to the surface of the angular light sensor. The angular light sensor may have an angular resolution of more than 1 arc minute but less than 60 arc minutes. The angular light sensors may have an area between 5 microns×5 microns and 1 mm×1 mm, in some implementations. The thickness of the sensor may be between 5 microns and 500 microns.

In some implementations, the FOV of the angular light sensor, the light source, or both can by dynamically tilted (for instance with a MEMS device) and/or increased/decreased (for instance adding a lens on the light source to increase divergence) to illuminate larger or smaller sections of the eyebox. A tilting mechanism may be configured to dynamically tilt a FOV of an angular detection range of the angular light sensors. The tilting mechanism may be a MEMS device, in some implementations.

In some implementations of the disclosure, the angular light sensor includes Talbot sensors. Potential advantages of Talbot sensors are non-camera based eye tracking, micro-sized, large detectable eye tracking system, relatively high angular sensitivity, and less processing time.

Figure 7A:
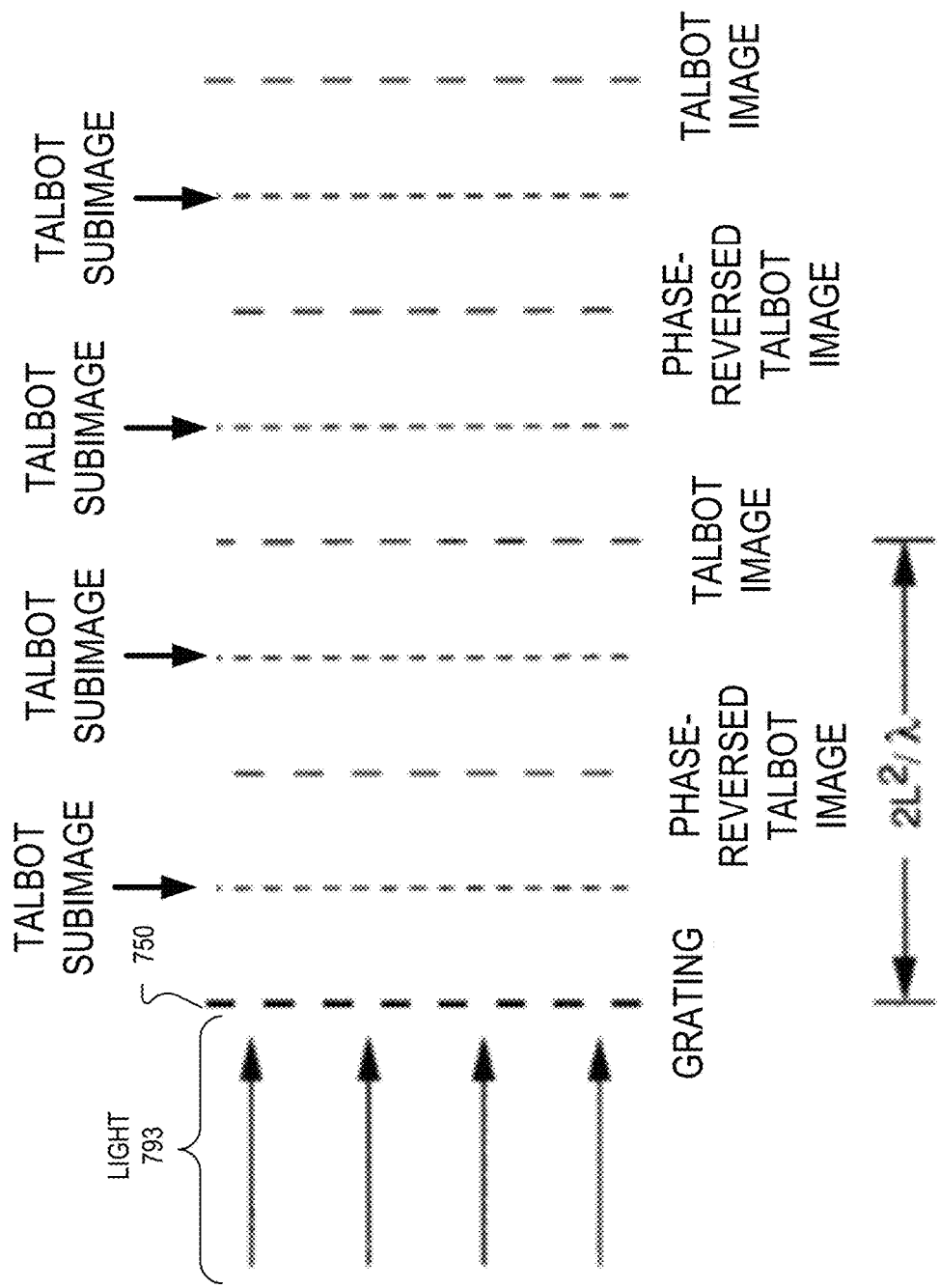
FIG. 7A illustrates locations of Talbot image planes behind a grating.

FIG. 7A illustrates locations of Talbot image planes behind a grating 750 to image light 793. FIG. 7A shows Talbot image planes, various Talbot subimage locations, and phase-reverse Talbot image planes.

FIG. 7B includes equation 781 and 782 that provide the Talbot distance z for Talbot images with respect to a grating pitch d and a wavelength λ of incident light on a Talbot sensor. Equation 783 of FIG. 7B provides the Talbot distance z for off-axis Talbot imaging with respect to grating pitch d, the incident angle θ, and a wavelength λ of incident light.

Figure 8:
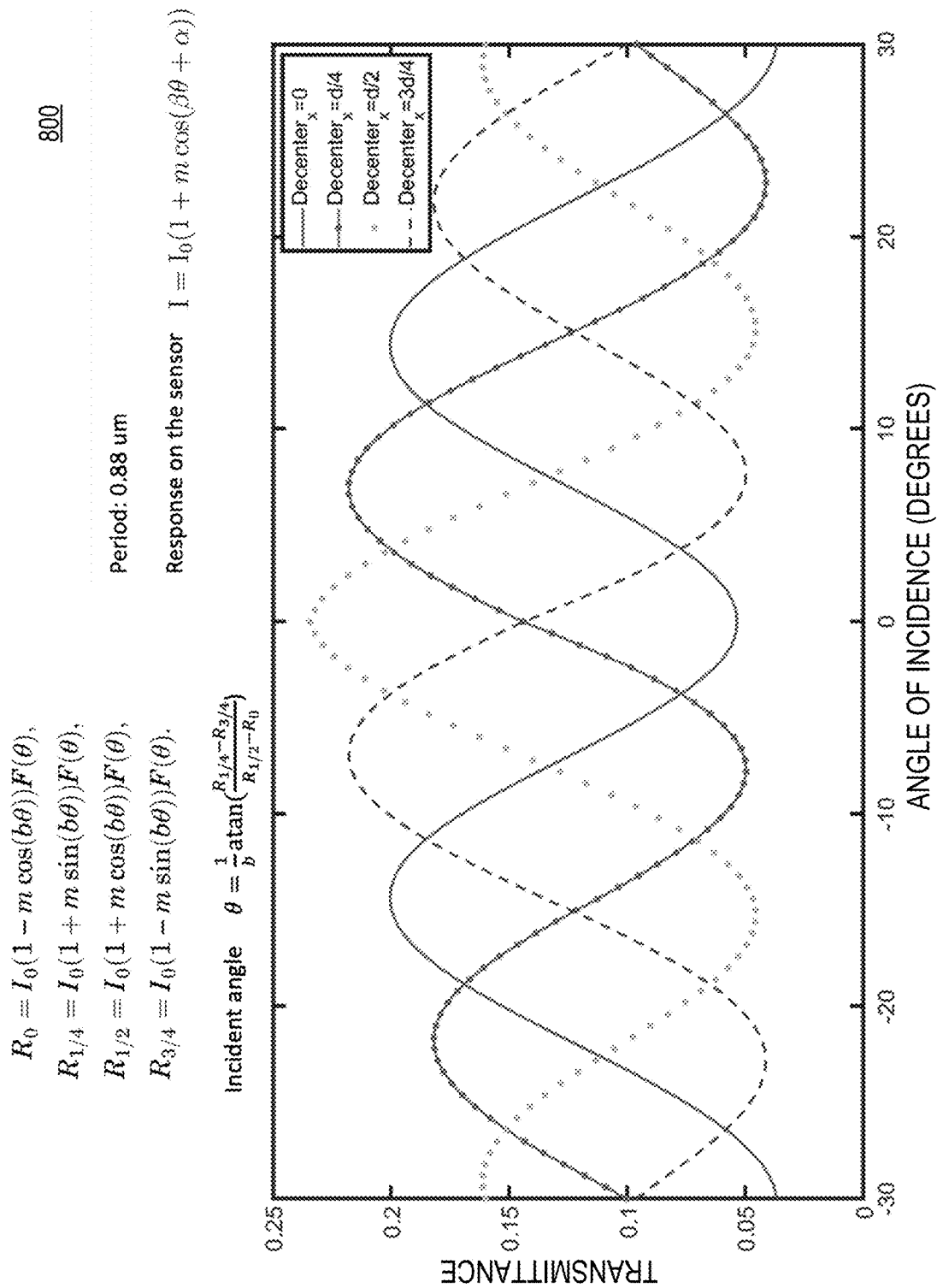
FIG. 8 illustrates a graph showing a relationship between the angle of incidence (AOI) of light on an angular light sensor and the transmittance of the Talbot sensor for an example period of 0.88 microns, in accordance with aspects of the disclosure.

FIG. 8 illustrates a graph 800 showing a relationship between the angle of incidence (AOI) of light on an angular light sensor and the transmittance of the Talbot sensor for an example period of 0.88 microns, in accordance with implementations of the disclosure.

Figure 9:
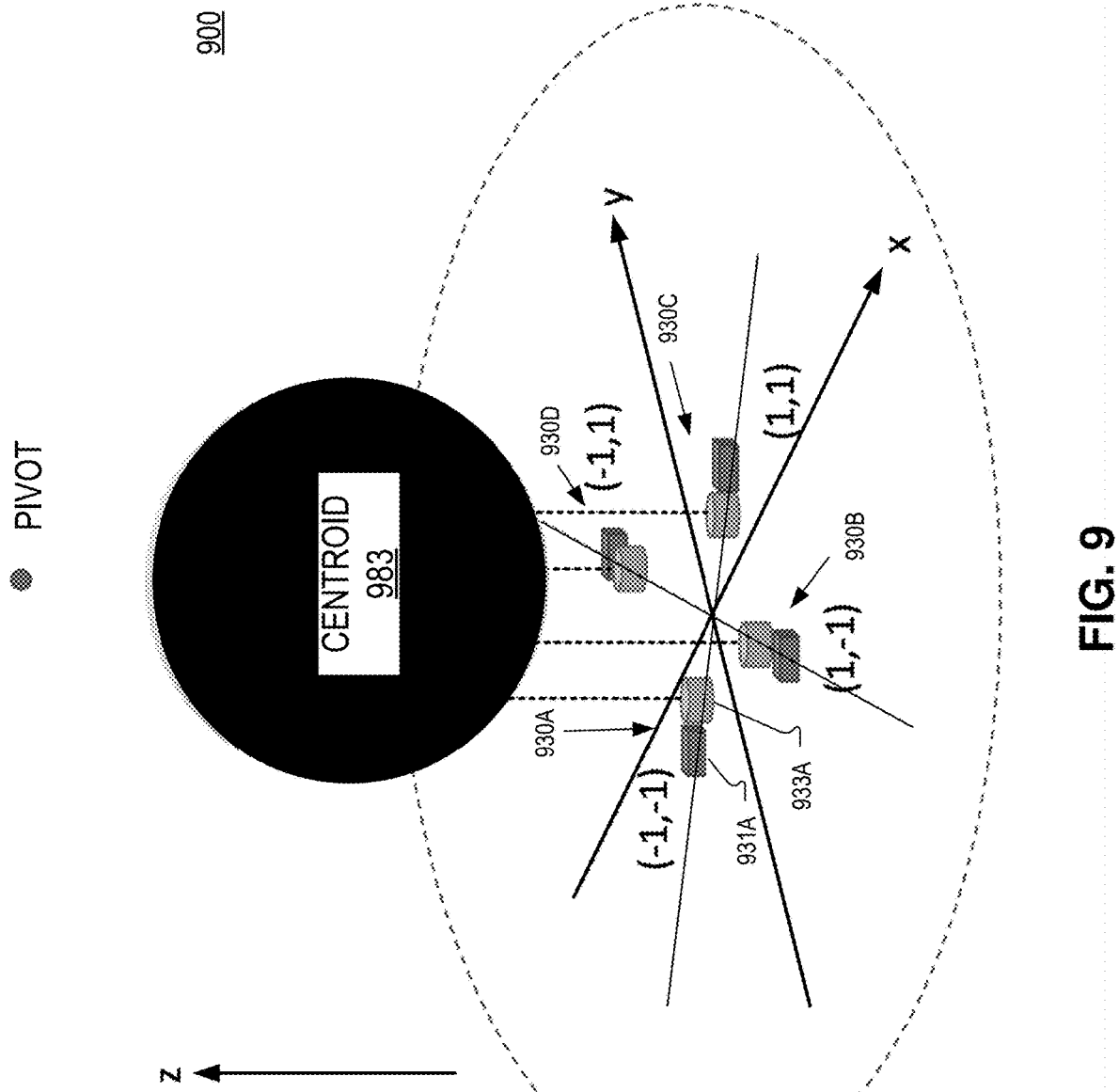
FIG. 9 illustrates an example eye-tracking system including four sensor-source pairs configured to illuminate a cornea shaped centroid with near-infrared illumination light, in accordance with aspects of the disclosure.

FIG. 9 illustrates an example eye-tracking system 900 including four sensor-source pairs 930A, 930B, 930C, and 930D (collectively referred to as sensor-source pairs 930) configured to illuminate a cornea shaped centroid 983 with near-infrared illumination light, in accordance with implementations of the disclosure. Sensor-source pair 930A includes a near-infrared light source 933A (e.g. LED or VCSEL) and an angular light sensor 931A that includes at least one Talbot detector. Sensor-source pairs 930B, 930C, and 930D also include a near-infrared light source and an angular light sensor 931 that includes at least one Talbot detector. The near-infrared illumination light illuminates the cornea and at least a portion of the near-infrared illumination light is reflected back to the sensors 931. The field-of-view (FOV) of the sources 933 may be between 5 and 20 degrees. In some implementations, the FOV of the sources 933 may be approximately 10 degrees.

In the illustration, the distance along the z axis from the coordinate 0,0 (in the middle of sensor-source pairs 930) to the apex of the cornea is between 10 and 25 mm. This distance may be referred to as "eye relief." In some implementations, the eye relief is approximately 16 mm. The distance between sensor-source pair 930A (−1,−1) and sensor-source pair 930C (1,1) is 2 mm, as indicated by their coordinates, in the illustrated example. Similarly, the distance between sensor-source pair 930B (1,−1) and sensor-source pair 930D (−1,1) is 2 mm. Of course, other suitable spacing dimensions are possible.

Figure 10:
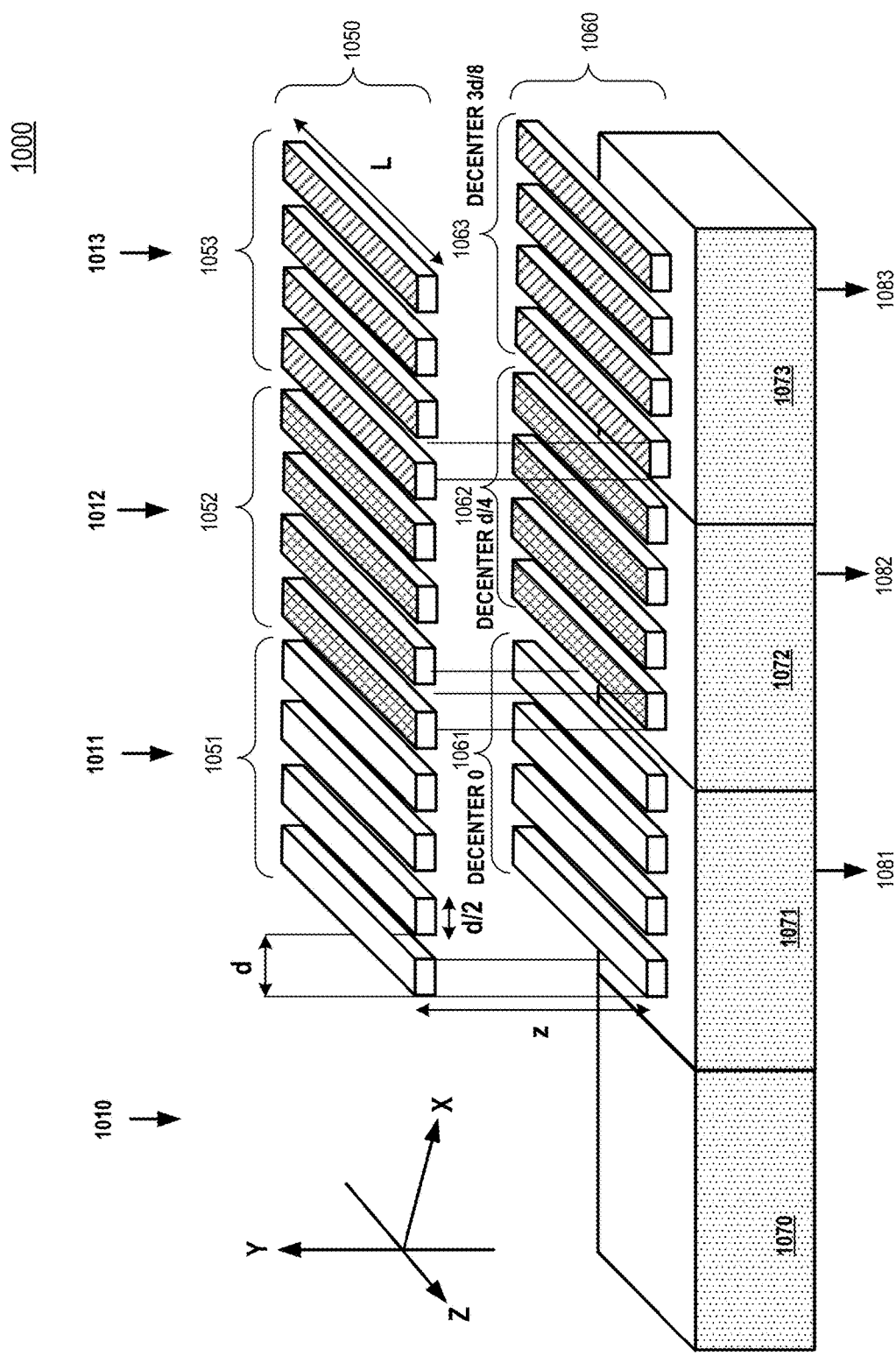
FIG. 10 illustrates an example sensor structure that includes a first light detector, a second light detector, and a third light detector, in accordance with aspects of the disclosure.

FIG. 10 illustrates an example sensor structure 1000 that includes a first light detector 1011, a second light detector 1012, and a third light detector 1013, in accordance with implementations of the disclosure. Sensor structure 1000 may optionally include a light detector 1010 that may be used for normalizing incident power without a grating structure disposed over photodiode 1070. Sensor structure 1000 may be included in a sensor 931 of FIG. 9.

FIG. 10 illustrates example Talbot sensors oriented in the XY plane that are responsible for the measurement of the angle of incidence (AOI) in the XY plane. Two layers of gratings (layer 1050 and 1060) are in the structure. The second layer of grating 1060 has different decenter values. Here, three decenter values 0, d/4, 3d/8 are chosen to be fabricated for light detectors 1011, 1012, and 1013, respectively. The pitch d is 2.55 microns, in an example implementation. In the illustrated implementation, the width of each grating is d/2 so that the pitch has a 50% duty cycle. In other words, the grating elements are spaced from each other the same as a width of a grating element, in the example illustration of FIG. 10. In an implementation, the length L of the grating elements is 10 microns. In an implementation, the first grating layer 1050 is spaced apart from the second grating layer 160 by a dimension z, where z is approximately 22 microns.

In FIG. 10, first light detector 1011 includes first high-grating 1051, first low-grating 1061, and first photodiode 1071. First photodiode 1071 receives incident light that encounters first high-grating 1051 and then first low-grating 1061. First low-grating 1061 is decentered with respect to first high-grating 1051 by a shifting factor of 0.

Second light detector 1012 includes second high-grating 1052, second low-grating 1062, and second photodiode 1072. Second photodiode 1072 receives incident light that encounters second high-grating 1052 and then second low-grating 1062. Second low-grating 1062 is decentered with respect to second high-grating 1052 by a shifting factor of 3d/8.

Third light detector 1013 includes third high-grating 1053, third low-grating 1063, and third photodiode 1073. Third photodiode 1073 receives incident light that encounters third high-grating 1053 and then third low-grating 1063. Third low-grating 1063 is decentered with respect to third high-grating 1053 by a shifting factor of 3 d/8.

Photodiodes 1071, 1072, and 1073 may generate angular signals 1081, 1082, and 1083, respectively, in response to receiving incident light. In some implementations, a fourth light detector, a fifth light detector, and a sixth light detector are rotated 90 degrees with respect to the first light detector, the second light detector, and the third light detector to form a sensor having six light detectors.

Figure 11:
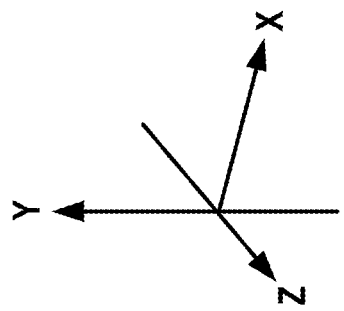
FIG. 11 illustrates sensor structure having three sensors oriented in the YZ plane, in accordance with aspects of the disclosure.
Figure 11:
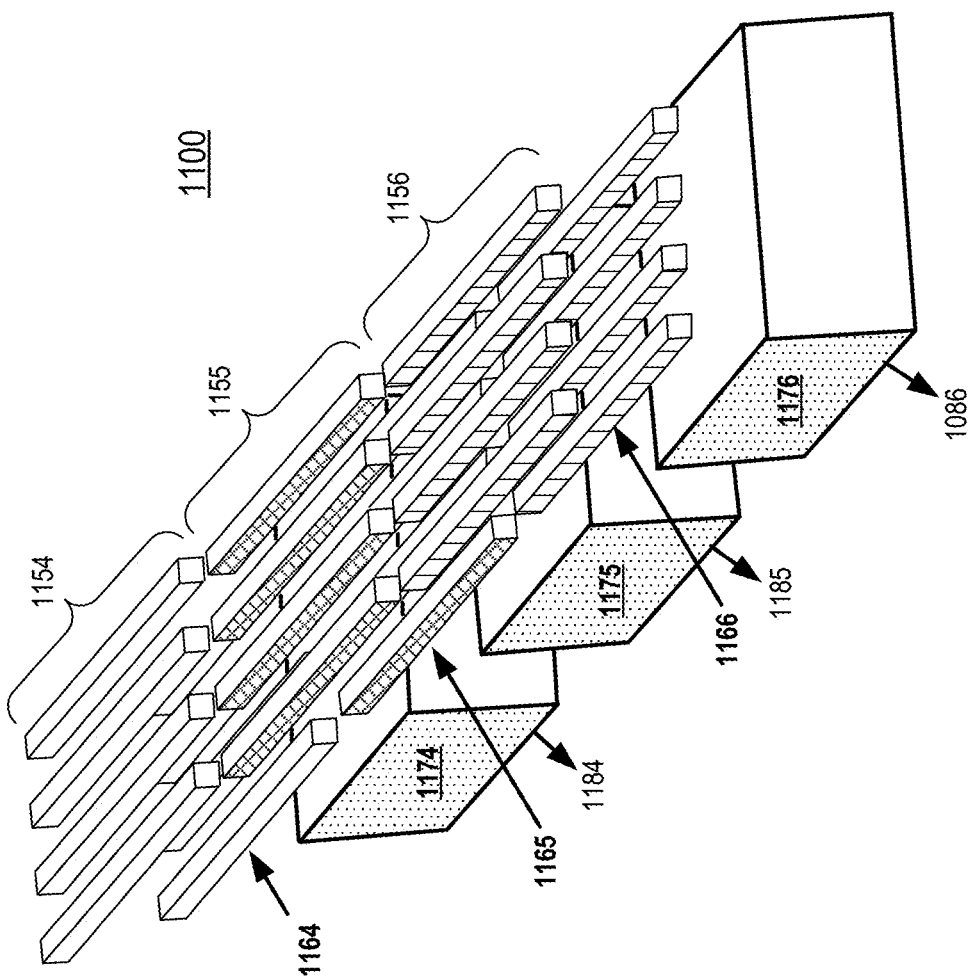

FIG. 11 illustrates sensor structure 1100, in accordance with implementations of the disclosure. Sensor structure 1100 is the same or similar to sensor structure 1000 except that the three sensors are oriented in the YZ plane and they are responsible for the measurement of the AOI in the YZ plane, in accordance with implementations of the disclosure. Sensor structure 1100 may also optionally include a light detector 1110 (not illustrated) that may be used for normalizing incident power without a grating structure disposed over its photodiode (similar to light detector 1010). Photodiodes 1174, 1175, and 1176 may generate angular signals 1184, 1185, and 1186, respectively, in response to receiving incident light.

FIG. 11 illustrates fourth low-grating 1164 disposed between fourth high-grating 1154 and fourth photodiode 1174, fifth low-grating 1165 disposed between fifth high-grating 1155 and fifth photodiode 1175, and sixth low-grating 1166 disposed between sixth high-grating 1156 and sixth photodiode 1176.

Figure 12:
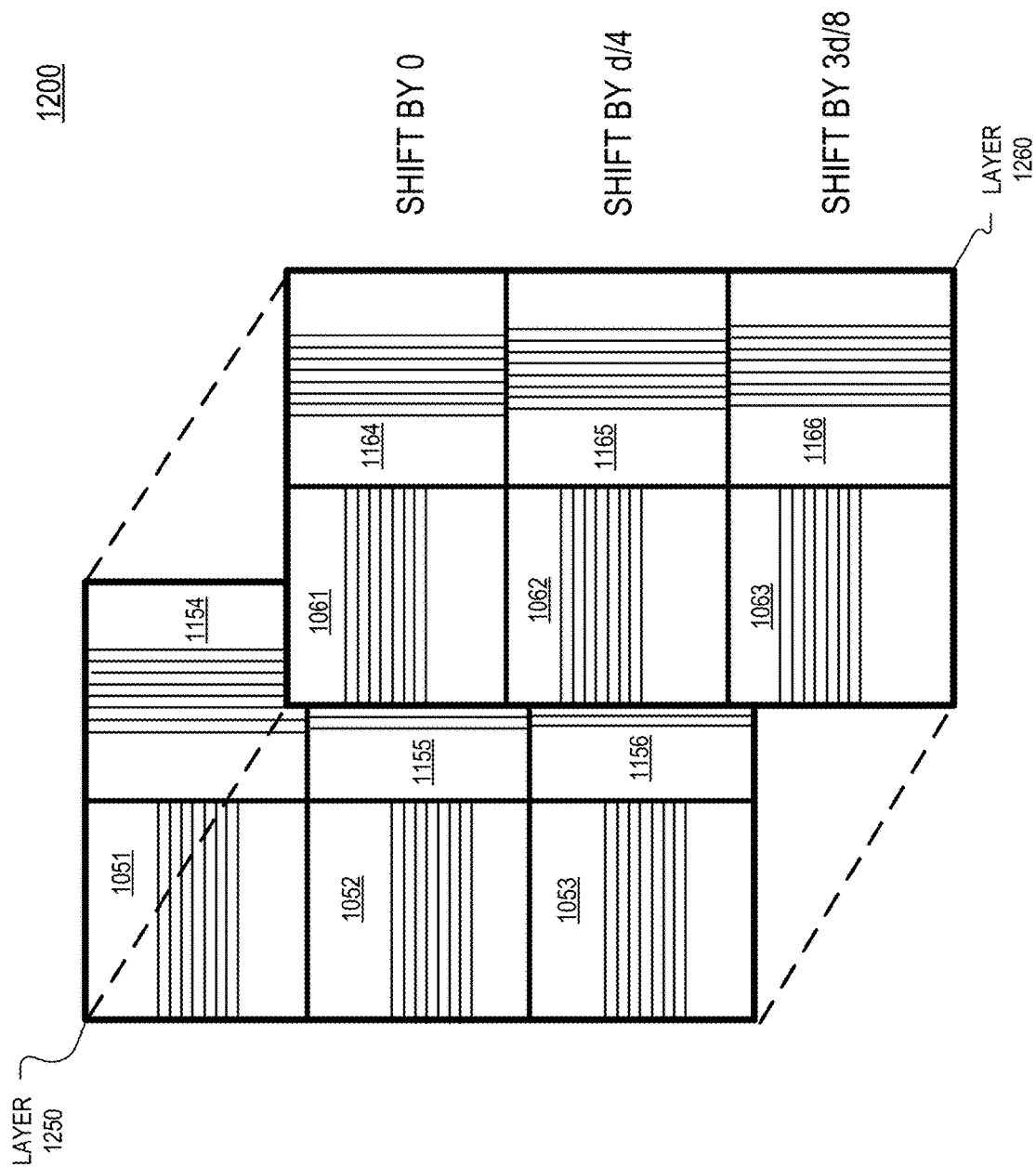
FIG. 12 illustrates a combination sensor structure having sensors for the XY plane and sensors for the YZ plane, in accordance with aspects of the disclosure.

FIG. 12 illustrates a combination sensor structure 1200 that combines sensor structure 1000 (sensors in XY plane) and sensor structure 1100 (sensors in YZ plane), in accordance with implementations. The sensors in the left column are oriented in the XY plane to measure AOI in the XY plane and the sensors in the right column are oriented in the YZ plane to measure AOI in the YZ plane. The sensors in the first row have 0 decenter values, the second row have d/4 and the last row have 3d/8 decenter values. In the illustrated implementation, first grating layer 1250 may include gratings 1051, 1052, 1053, 1154, 1155, and 1156 while second grating layer 1260 may include gratings 1061, 1062, 1063, 1164, 1165, and 1166.

The materials used in the grating substrate may be copper, chromium, or other suitable material. The space between the two layers of gratings may be filled with $SiO_2$ or other suitable optically transparent substrate.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 499) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye-tracking system comprising:
   a plurality of infrared light sources configured to emit infrared illumination light to an eyebox region; and
   a plurality of angular light sensors configured to receive returning infrared light that is the infrared illumination light reflecting from the eyebox region, wherein the angular light sensors in the plurality are configured to output angular signals representing an angle of incidence of the returning infrared light with respect to positions of the angular light sensors,
   wherein each infrared light source is paired with an angular light sensor and separated by less than 500 microns.

2. The eye-tracking system of claim 1, wherein the angular light sensors have an angular detection range between 1 degree and 85 degrees with respect to a photo-detector surface of the angular light sensors.

3. The eye-tracking system of claim 1, wherein the angular light sensors have a sensor area of less than 150 microns×150 microns.

4. The eye-tracking system of claim 1, wherein the angular light sensors include:
   a first photodiode configured to receive the returning infrared light;
   a second photodiode configured to receive the returning infrared light; and
   a tilted light barrier disposed between the first photodiode and the second photodiode, the tilted light barrier being angled with respect to a surface-normal of a sensing plane common to both the first photodiode and the second photodiode, wherein a ratio of a first signal generated by the first photodiode and a second signal generated by the second photodiode indicates the angle of incidence of the returning infrared light.

5. The eye-tracking system of claim 1, wherein the angular light sensors include:
   a light barrier;
   a first photodiode configured to receive the returning infrared light;
   a second photodiode configured to receive the returning infrared light, wherein the first photodiode is disposed between the light barrier and the second photodiode; and
   processing logic configured to receive a first signal generated by the first photodiode and a second signal generated by the second photodiode, wherein the processing logic generates a Center of Mass value based on the first signal and the second signal, wherein the first signal is assigned a first weighting factor that is less a second weighting factor assigned to the second signal in generating the Center of Mass value.

6. The eye-tracking system of claim 1, wherein a field of view (FOV) of an angular detection range of the angular light sensors is tilted with respect to a surface-normal of photodetectors of the angular light sensors.

7. The eye-tracking system of claim 1 further comprising:
   a tilting mechanism configured to dynamically tilt a field of view (FOV) of an angular detection range of the angular light sensors.

8. The eye-tracking system of claim 7, wherein the tilting mechanism includes a micro-electro-mechanical system (MEMS) device.

9. A head mounted device comprising:
   a frame for securing the head mounted device on a head of a user; and
   an eye-tracking system including:
      a plurality of infrared light sources configured to emit infrared illumination light to an eyebox region; and
      a plurality of angular light sensors configured to receive returning infrared light that is the infrared illumination light reflecting from the eyebox region, wherein the angular light sensors in the plurality are configured to output angular signals representing an angle of incidence of the returning infrared light with respect to positions of the angular light sensors, wherein the angular light sensors include:
      a first photodiode configured to receive the returning infrared light;
      a second photodiode configured to receive the returning infrared light; and
      a tilted light barrier disposed between the first photodiode and the second photodiode, the tilted light barrier being angled with respect to a surface-normal of a sensing plane common to both the first photodiode and the second photodiode, wherein a ratio of a first signal generated by the first photodiode and a second signal generated by the second photodiode indicates the angle of incidence of the returning infrared light.

10. The head mounted device of claim 9, wherein the plurality of infrared light sources and the plurality of angular light sensors are mounted to the frame of the head mounted device.

11. The head mounted device of claim 9 further comprising:
    a lens held by the frame, wherein the lens passes visible scene light from an external environment to the eyebox region, and wherein the plurality of infrared light sources and the plurality of angular light sensors are disposed on the lens.

12. An angular light sensor comprising:
    a first light detector including a first photodiode, a first high-grating, and a first low-grating, wherein the first low-grating is disposed between the first high-grating and the first photodiode; and
    a second light detector including a second photodiode, a second high-grating, and a second low-grating, wherein the second low-grating is disposed between the second high-grating and the second photodiode, wherein the second low-grating is decentered with respect to the second high-grating, and wherein the first low-grating is centered with respect to the first high-grating;

a third light detector including a third photodiode, a third high-grating, and a third low-grating, wherein the third low-grating is disposed between the third high-grating and the third photodiode;

a fourth light detector configured as the first light detector;

a fifth light detector configured as the second light detector; and a sixth light detector configured as the third light detector, wherein the fourth light detector, the fifth light detector, and the sixth light detector are rotated 90 degrees with respect to the first light detector, the second light detector, and the third light detector.

13. The angular light sensor of claim 12, wherein the second low-grating is decentered with respect to the second high-grating by a shifting factor of d/4, where d is the pitch of the second high-grating, the second low-grating, the first low-grating, and the first high-grating.

14. The angular light sensor of claim 13, wherein the pitch has a 50% duty cycle.

15. The angular light sensor of claim 12, wherein a grating material is chromium or copper for the second high-grating, the second low-grating, the first low-grating, and the first high-grating.

16. The angular light sensor of claim 12, wherein the angular light sensor is configured to measure an angle of incidence of light having a wavelength $\lambda$, and wherein the first low-grating is spaced from first high-grating by distance z, where z is $2d^2/\lambda$, where d is the pitch of the second high-grating, the second low-grating, the first low-grating, and the first high-grating, and further wherein the second low-grating is also spaced from second high-grating by the distance z.

17. The angular light sensor of claim 12, wherein an optically transparent substrate is disposed between the first high-grating and the first low-grating, and wherein the optically transparent substrate is also disposed between the second high-grating and the second low-grating.

18. The angular light sensor of claim 12, wherein the third low-grating is decentered with respect to the third high-grating by a shifting factor of 3d/8, where d is the pitch of the third high-grating and the third low-grating.

* * * * *